Figure 1:
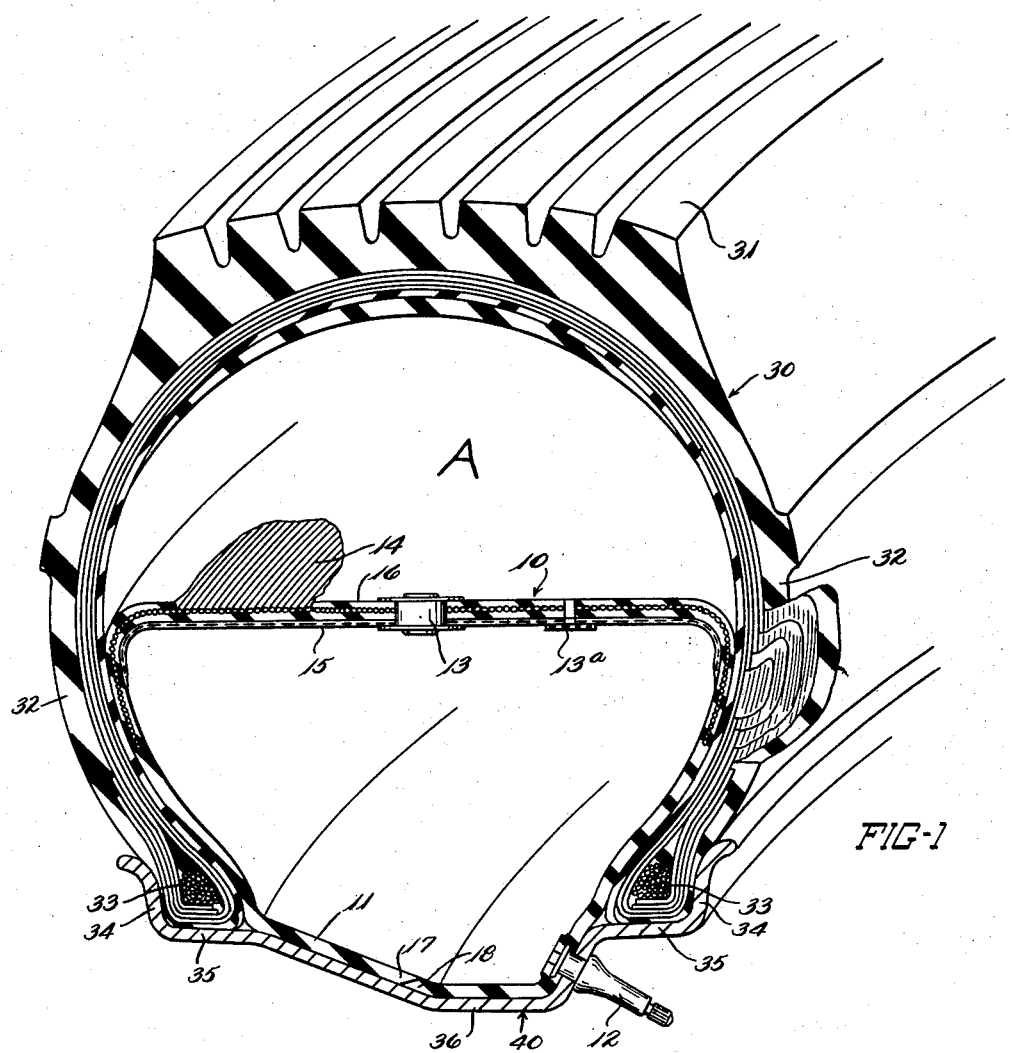

Aug. 11, 1959 — F. B. PFEIFFER — 2,898,969

STABILIZER MEANS

Filed March 11, 1957

INVENTOR.
FRED B. PFEIFFER
BY

United States Patent Office 2,898,969
Patented Aug. 11, 1959

2,898,969

STABILIZER MEANS

Fred B. Pfeiffer, Akron, Ohio

Application March 11, 1957, Serial No. 645,133

2 Claims. (Cl. 152—341)

This invention relates to a stabilizer for pneumatic tires and the method of making same.

Heretofore tire engineers have appreciated the advantages of cord tires in which the cords of the carcass of the tire were disposed at or substantially at a right angle to the circumferential plane of the tire. Such tire construction is commonly identified in the tire industry as zero angle or transverse cord tires. For many years the tire industry has diligently endeavored to produce a satisfactory transverse cord tire but without success until the present invention. A single characteristic of the transverse cord tires, namely, lack of lateral stability in service has, before applicant's invention, defeated the tire manufacturers' efforts to produce such tires that were commercially acceptable. Resort to many expedients have been taken to stabilize transverse cord tires the most common of which have been to include in the tire structure tread-plies or breakerstrips of special construction such, for example, as shown in United States Patent No. 2,493,614, or reinforcing material extending from the beads radially outwardly in the tire carcass. Such tread-plies, breaker-strips and reinforcement were used in numerous combinations. Another expedient was wider base rims but none of the heretofore known expedients were successful.

It is an object of the present invention to provide means for providing lateral stability to pneumatic cord tires having the cords, whether of wire, textile material or of materials such, for example, but without limitation, as rayon or nylon.

Another object of the invention is to provide such means in the form of a removable tube of long service life and useable in successive tires.

Another object is to provide stabilizing means for pneumatic tires which means also function as an auxiliary tire load carrying means in the event of a tire blowout.

A further object is to provide tire stabilizing means that simultaneously subjects a pneumatic tire to multiple tire inflationary pressures changeable as required.

A still further, and a principle object of the invention, is to provide means that will stabilize a tire in a lateral direction without affecting in any way the radial deflection of the crown or tread portion of a tire.

The present invention is of particular usefulness in relation to wire tires. Wire tires as presently available are extremely "hard-riding" due to the necessity of high inflation to prevent injurous deflection of the wire cords. Zero angle wire cords will stand the flexing but do not provide laterial stability to the tire. To overcome this fault of lack of lateral stability stiff tread plies have been used which tread plies do stabilize the tires, to some extent, but at the expense of the soft riding quality the tires would otherwise have.

Figure 2:
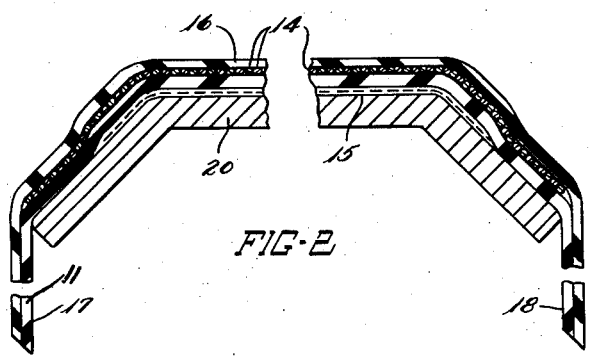

Other advantages of the invention will be apparent to those familiar with the art from the following description and by reference to the drawing wherein is shown in Figure 1, a fragmentary perspective view, partly in section, of a tube embodying the present invention, with the tube in operative relation with a tire and rim, and Figure 2 is a sectional view of a building drum with the tube material assembled thereon as it appears just before its removal from the drum preparatory to joining the radially inner edges to complete the tube to be laid and vulcanized in a tube mold.

The tube referred to in the drawing generically as 10 comprises a reinforced rubber body 11 and valves 12, 13 and 13a. The crown portion of the tube body 11 is reinforced with spiral wound circumferentially extending cords 14; a layer of rubberized fabric 15; and a thin layer of rubber 16 covering the cords as will be seen by reference to the drawing.

Tube 10 may be fabricated in any manner found satisfactory and it is to be understood that the arrangement of the materials and the material itself composing the tube may be modified without departing from the spirit of the invention.

A preferred method of building and molding the tube comprises providing a rigid collapsible building drum 20 which is rotatably supported on any type of stand as, for example, the tire building drum disclosed in U.S. Patent No. 2,042,498, except the contour of the drum to be modified to conform to that of drum 20. With drum 20 expanded a thin coat of rubber cement may be applied to the drum's outer surface and the cement permitted to dry.

Next a strip of rubberized square-woven bias-cut fabric is laid about the crown portion of the building drum and extended over the shoulders of the drum a short distance as shown in the Figure 2.

A strip 11 (referred to above as the tube body) of unvulcanized rubber of proper width and thickness is then applied to the drum by centering one end on the drum and progressively stretching the strip about the drum in the well-known fashion of applying tire plies to a building drum. The ends of strip 11 are overlapped forming a splice. The amount of stretch given strip 11 is only enough to facilitate splicing the edges of the strip 11 to complete a tube and to cause the strip to fit snugly on the drum.

The next step is to wind spirally, for example, a wire 14 over strip 11 beginning radially inwardly from the crown of the drum as, for example, if the tube is to be for an 8.00 size tire, about 2" radially inwardly from the edge of said crown. The winding then continues, with the rounds of wire closely spaced, as illustrated, over the crown of the drum and down the drum's opposite side a distance equal to the extent of the winding on the other side, namely 2" from the edge of the crown. The wire may be the same as is presently in common use as strain members in wire tires and may be treated in the same way for adhesion with the rubber. It is to be understood, however, that the invention is not to be limited to any particular kind of wire, or to wire alone as any substantially non-stretchable cord of sufficient strength is satisfactory, as for example, but without limitation, pre-stretched nylon cord. The ends of wire 14 may be taped or otherwise treated to prevent them from piercing or breaking out of the body of the tube.

After the wire is wound, as just described, it is covered with a thin layer 16 of unvulcanized rubber after which the assembled material is removed from drum 20 and the edges 17 and 18 are spliced together to form a splice and an endless tube.

An inner tube valve 12, which may be of any acceptable type is next attached to the tube in the usual manner of incorporating such valves in regular tire inner tubes and for the same purpose.

After vulcanization of the assembly as explained hereinafter a differential fluid pressure valve, referred to generally as 13, is incorporated in the crown portion of tube 10 and it is to be understood that this may be done by different expedients that may be found satisfactory. A flutter valve 13a is also disposed in the crown of tube 10 also by any method found satisfactory. Examples of valves 12, 13 and 13a are found in U.S. Patent 2,554,815 to which reference is made for both a method of construction and the functioning of the valves. Obviously various types of valving may be used to obtain the functioning required by the present invention.

After the tube 10 is formed in its unvulcanized state it is laid in a tube mold and shaped and vulcanized in the usual manner of molding inner tubes. The shape and size of the tube relative to the tire and rim with which it is to be used is of vital importance. The crown portion is molded substantially cylindrical and the circumferentially extending wire in the cylindrical or crown portion retains that shape when tube 10 is inflated. It is to be noted that the coils of wire in the crown of the tube are bound together by rubber and the bias fabric strip 15. When the sides or shoulders of tube 10 are not supported laterally as by wall of a tire, the coils of wire will separate until lateral support is encountered. In the present illustration this lateral support is provided by the walls of a substantially zero angle wire tire 30 having the usual thread, sides and bead portions 31 and 32 and 33 respectively. Tire 30 is mounted on a standard or conventional drop center rim 40 having the usual side flanges 34, bead seats 35, and well 36.

The diameter of the coils of cord 14 does not permit increase in circumference of tube 10 but it will be noted coils of the cord lying in and radially inwardly of the shoulders of the tube are free to move laterally except as restrained by the elastic rubber in which the wire is embedded. The shoulder cord or wire functions to permit free movement of the tube at that area while preventing the shoulder portions from being forced, by internal inflationary pressure in the tube, radially outwardly past the crown portion of the tube. The tube is molded to a width and shape to fit snugly against the rim 40 and the tire up to approximately 50% of the inside section height of the tire in which it is to be mounted.

In operation the tube is installed in a tire and the tire and tube mounted on a rim in the usual manner of mounting a tire with a tube on a rim for service as shown in Figure 1. The tire and tube is then inflated through valve 12 to predetermined pressure as for example 50# of inflationary pressure in tube 10 and 30# in the tire in chamber A. This is accomplished by differential fluid pressure valve 13 which is designed to require 20# pressure to open. Inflationary air is turned into tube 10 until the internal pressure reaches 50# at which time the inflationary pressure in chamber A will have reached 30#. With the internal pressures as described above it will be seen that the lower half of the tire 30 will be subjected to 50# pressure which is very high for present passenger type pneumatic tires. This high pressure provides a higher degree of rigidity to the lower portion of the tire than the 30# of internal pressure provides for the top or crown portion of the tire. At the same time the high pressure in tube 10 insures the beads 33 being pressed firmly against the rim and insures an air tight seal between the rim and the tire beads. Also in the event of a sudden loss of air from the outer chamber, as by a tire blowout, the tube 10 continues to lock the tire beads against the rim and the tube crown carries the tire load making it possible for the driver of an automobile, on which tire 30 may be mounted and blown out, to bring the automobile to a safe stop. It will be understood that in the event of tire blowout the pressure in the tube will gradually drop to 20# as the air passes from the tube through valve 13.

During normal running service of the assembly shown in Figure 1 the crown portion of the tire provides a soft ride comparable to that which would be received from the same tire without tube 10 and inflated to 30#. The tire, however, is stabilized at its contact with the rigidly inflated tube but of great importance the tube has the ability to and does follow and contact the sides of the tire as the tire sides flex under load. This movement of the tube is made possible by the peculiar arrangement of the wire at the shoulder portions of the tube. It is an important feature of the invention that there is a gradual tapering off of the contact of the shoulders of the tube and the tire so as not to create a localized flexing line of the tire at its contact with the tube. Applicant prefers to terminate the wire winding as illustrated but it is to be understood that it can be extended about the tube any amount desired.

The present illustration of the structure embodying the invention shows fabric strip 15, but this may be omitted depending on the spacing of the wire coils, the modulus and thickness of the rubber. It is to be understood that tube 10 may be reinforced by rubber strips or otherwise at its shoulder portions.

It will now be seen that applicant has provided means whereby a zero angle cord tire is given improved lateral stability without sacrificing the soft ride quality of the tire. It is further pointed out that the affect of applicant's invention is similar to a transverse cord tire mounted on a very wide base rim, but without subjecting the tire to the sudden stop of tire flexing which occurs at a wide base rim. It is to be understood that the invention contemplates fashioning a plural compartment tube having inner and outer chambers with graduated pressures controlled by valves similar to valves 13 and 13a described above.

The detailed description of the particular embodiment of the invention illustrated and described herein is not to be construed as limiting the invention thereto. The invention includes all features of patentable novelty residing in the foregoing description and the accompanying drawing.

What is claimed:

1. In combination, a tire rim, a fluid retaining laterally unstable tire mounted on said rim, and a tire stabilizer tube mounted in said tire; said tire having reinforcing cords in the body thereof inclined at an angle of approximately 90° to that median plane of the tire which is normal to its axis of rotation; said tube having a cylindrical crown and rounded shoulder portions, said tube having its radially inner portion in contact with said rim and its crown portion spaced from the crown portion of said tire a distance equal to approximately 50% of the inside cross-sectional height of the tire; a chamber defined by said tube and tire; said tube being composed of rubbery material reinforced across its crown portion and a distance radially inwardly on said shoulder portions with circumferentially spirally wound inextensible cord to prevent radial expansion of said crown portion when the tube is subjected to inflation in service; the extent of said shoulder reinforcement and the width of said tube relative to the distance between the sides of the tire being such that at least a portion of each of said reinforced shoulder portions flexes with the adjoining tire sidewall and is continuously in contact therewith; a differential fluid valve incorporated in the wall of said tube, whereby inflation pressure within said tube is automatically retained at a higher pressure than the inflation pressure in said chamber, whereby the sides of the tire laterally outwardly of said tube are subjected to higher inflationary pressure than the sides of the tire radially outwardly of the area of contact of said tube with the tire.

2. In combination, a tire rim, a fluid retaining laterally unstable tire mounted on said rim, and a tire stabilizer tube mounted in said tire; said tire having reinforcing cords in the body thereof inclined at an angle of approximately 90° to that median plane of the tire which is normal to its axis of rotation; said tube having a cylindrical crown and rounded shoulder portions, said tube having its radially inner portion in contact with said rim and its crown portion spaced from the crown portion of said tire a distance equal to approximately 50% of the inside cross-sectional height of the tire; a chamber defined by said tube and tire; said tube being composed of rubbery material reinforced across its crown portion and a distance radially inwardly on said shoulder portions with closely spaced circumferentially extending inextensible cord to prevent radial expansion of said crown portion when the tube is subjected to inflation in service; the extent of said shoulder reinforcement and the width of said tube relative to the distance between the sides of the tire being such that at least a portion of each of said reinforced shoulder portions flexes with the adjoining tire sidewall and is continuously in contact therewith; a differential fluid valve incorporated in the wall of said tube; whereby inflation pressure within said tube is automatically retained at a higher pressure than the inflation pressure in said chamber, whereby the sides of the tire laterally outwardly of said tube are subjected to higher inflationary pressure than the sides of the tire radially outwardly of the area of contact of said tube with the tire.

References Cited in the file of this patent

UNITED STATES PATENTS

| | | |
|---|---|---|
| 2,554,815 | Church | May 29, 1951 |
| 2,674,291 | Campbell | Apr. 6, 1954 |
| 2,688,983 | Bowerman | Sept. 14, 1954 |

FOREIGN PATENTS

| | | |
|---|---|---|
| 615,076 | Great Britain | Dec. 31, 1948 |